March 1, 1960

L. RUPERT 2,926,449

DEVICE FOR RELEASING SNAGGED FISH HOOKS-HANDY BOY

Filed July 30, 1957

INVENTOR.
LOUIS RUPERT
Louis Rupert

United States Patent Office 2,926,449
Patented Mar. 1, 1960

2,926,449

DEVICE FOR RELEASING SNAGGED FISH HOOKS—HANDY BOY

Louis Rupert, Fort Myers, Fla.

Application July 30, 1957, Serial No. 675,205

1 Claim. (Cl. 43—17.2)

This invention relates to fishing tackle and more particularly to a ring shape device for releasing snagged fishing lures.

It is an object of the present invention to provide an annular ring type fishing tackle accessory that may be selectively used to release a fishhook and/or fishing lures that becomes snagged in use.

It is another object of the present invention to provide an annular metal ring type device for detaching snagged fishhooks and/or fishing lures from stationary objects in a simple and efficient manner and which is provided with retrieving means for preventing loss thereof during use.

Other objects of the invention are to provide an annular ring type device for releasing snagged fishhooks bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
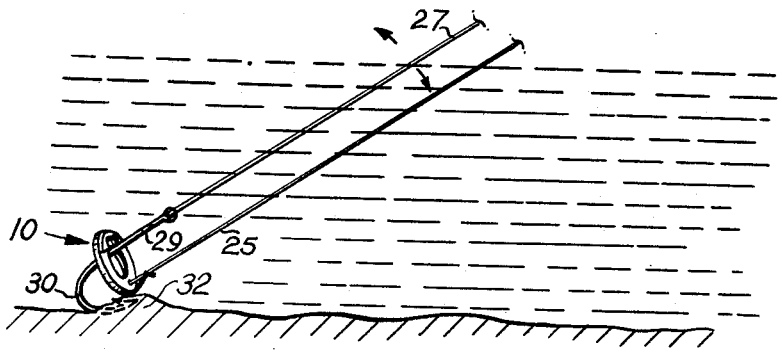
Figure 1 is a perspective view of a device made in accordance with the present invention in operative use.
Figure 2:
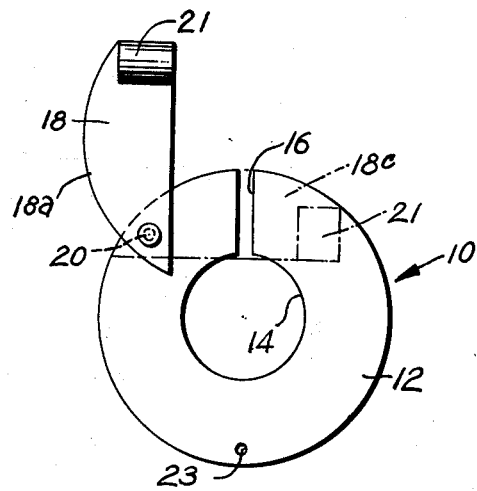
Figure 2 is a top plan view of the device shown in Figure 1.
Figure 3:
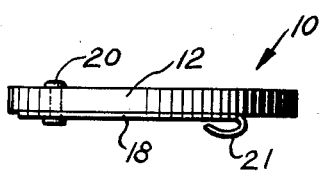
Figure 3 is an end elevational view of the device shown in Figure 2.

Referring now more in detail to the drawing, a fishing tackle accessory 10 made in accordance with the present invention is shown to include a substantially flat circular plate or ring 12 preferably of metal and flat like washer of uniform thickness having portions defining a central circular opening 14. A radially outwardly extending slit or slot 16 cut through the annular wall of the ring from the outer peripheral edge thereof to the central opening 14 and in direct alignment relative to a diametrical line drawn from the center of the ring and provides access between the central opening 14 and the outer periphery of the plate so that the plate or ring 12 may be slidably engaged with a fishing line in a manner hereinafter described.

A segmental circular plate 18 of uniform thickness is hingedly or pivotally connected at one end to the plate or flat ring 12 by means of a pivot pin 20 disposed in the annular wall of the flat ring for reciprocating pivotal movement about the longitudinal axis of the pivot pin 20 between an operative closed position 18c and an open position 18a for controlling the assembly and disassembly of the unit relative to the fishing line. The free end of said thumb plate 21 curls outwardly and provides a gripping surface for effecting this pivotal movement of the plate 18. Said plate 18 so arranged in its closed position 18c to leave the central opening 14 substantially free of any obstruction therefrom, and the outer curved periphery, or arc portion, of said plate 18 coinciding with the curved periphery of said flat ring 12.

A bore 23 extends perpendicularly through the circular plate 12 at a point diametrically opposite from the slit 16 and in line with a diametrical line drawn through the center of the opening 14 and longitudinally through said slot.

In use, a tie string 25 is secured within the bore 23 so as to prevent the loss of the unit in the event that the fishing line breaks or the device is accidentally shaken loose from the fish hook. By then rotating the closed segmental circular plate 18 to the open position 18a, the device may be placed upon the fishing line 27 and the plate moved to the closed position 18c so as to prevent disassembly of the unit from the line. The device is then permitted to slide downwardly along the line 27 into proximity with the shank 29 of the fish hook 30 that has become snagged upon debris 32 located beneath the body of water. This device thus adds sufficient weight to the lower extremity of the fishing tackle so that it is operative to vibrate the fish hook 30 in response to a jerking movement upon the pole that is held in the hand so as to amplify such jerking movement in the vicinity of the hook. Ordinarily, the line adjacent to the hook is so light that any jerking action of the pole is not properly transmitted to the hook so that it is virtually impossible to free the hook from the stationary object. It has also been found that in many instances the device 10 will not become dislodged from the fish line and hook after the hook has been freed, whereby it is not absolutely necessary to secure the tie string 25 thereto. In any event, the tie line 25 facilitates the proper positioning of the device 10 and permits it to be recovered in case the line is broken. After the line has been dislodged, the plate 18 which has been frictionally held in the closed position, may be rotated to the open position 18a to remove the device from the fish line.

While various changes may be made in the detail construction, it shall be understood that such changes shall be within the spirit and scope of the present invention as defined by the appended claim.

What I claim as new and desire to protect by Letters Patent of the United States is:

A fish lure retriever comprising, in combination, a flat ring-like member having a central opening slidably receiving a fish line, the annular wall of said ring-like member having a radially extending slot joining the outer peripheral edge thereof with said central opening for receiving a fishing line transversely therethrough for insertion to said central opening, a flat segmental curved edge plate embodying an arc and a cord with pointed end portions and of uniform thickness pivotally connected at one of said pointed end portions to the annular flat wall of said ring-like member, the arc portion of said segmental curved edge plate being of the same curvature as the curvature of the outer peripheral edge of said ring-like member, the opposite pointed free end of said segmental curved edge plate being curled outwardly away from the flat surface of said ring-like member providing a gripping surface for effecting pivotal movement of said segmental plate, a means for withdrawing said ring-like member along a fish line comprising a pull line, a bore extending through said annular wall of said ring-like member diametrically opposite said slot for receiving said pull line therein; said bore being positioned diametrically opposite from said segmental curved edge plate, the greatest width of said segmental curved plate being substantially equal to the width of said ring-like member between the central opening and the peripheral edge thereof, said central opening comprising a circular concentric central bore, said slot being arranged in line with a diametrical line drawn through the center of said central opening of said ring-like member and through said hole in the annular wall thereof, said segmental curved edge plate being adapted for reciprocating swinging movement between an open position and a closed position upon the top side of said ring-like member and with respect to said slot, and the segmental curved edge plate when in closed position overlapping said slot to close the same and having its arc juxtaposed and coinciding with the arc portion of said ring-like member, the cord of said plate when in closed position being arranged tangentially with the edge of the central opening in said ring-like member leaving the central opening free of any obstruction.

References Cited in the file of this patent

UNITED STATES PATENTS

| | | |
|---|---|---|
| 2,453,245 | McDonald | Nov. 9, 1948 |
| 2,481,975 | Brooks | Sept. 13, 1949 |
| 2,627,691 | Bress | Feb. 10, 1953 |
| 2,651,132 | Lennen | Sept. 8, 1953 |
| 2,714,777 | Peak | Aug. 9, 1955 |
| 2,779,120 | Moore | Jan. 29, 1957 |